United States Patent [19]

Sakabe et al.

[11] 3,764,777
[45] Oct. 9, 1973

[54] AUTOMATIC WELDING METHOD AND APPARATUS

[75] Inventors: Akira Sakabe, Urawa-shi; Mitsuhiro Sakagami; Kunio Arai, both of Funabashi-shi, all of Japan

[73] Assignee: Hitachi, Ltd., Tokyo, Japan

[22] Filed: Jan. 20, 1972

[21] Appl. No.: 219,439

[30] Foreign Application Priority Data
Jan. 22, 1971 Japan.................................. 46/1575
Feb. 22, 1971 Japan.................................. 46/7978

[52] U.S. Cl. .............................. 219/125 R, 228/45
[51] Int. Cl. .............................................. B23k 9/12
[58] Field of Search .......... 219/124, 125 R, 125 PL, 219/126, 137; 228/45

[56] References Cited
UNITED STATES PATENTS

| | | | |
|---|---|---|---|
| 3,249,733 | 5/1966 | Santilhano | 219/126 |
| 1,580,020 | 4/1926 | Cutler et al. | 219/125 R |
| 3,035,156 | 5/1962 | Staley | 219/125 |
| 3,437,786 | 4/1969 | Colinet et al. | 219/126 |
| 3,560,698 | 2/1971 | Taylor | 219/125 PL |

*Primary Examiner*—R. F. Staubly
*Assistant Examiner*—L. A. Schutzman
*Attorney*—Paul M. Craig, Jr. et al.

[57] ABSTRACT

A self-driven welding carriage with a welding torch mounted on it and travelling along a path with a side of work or plate perpendicular to the path as a guide while being magnetically adhered to the path, said carriage being sufficiently small in size to be capable of travelling even along a narrow path, said carriage being provided with a weaving means for helping deepen the penetration into the weld zone; and a method of performing all-position welding on a wide variety of joints by the use of the carriage.

13 Claims, 31 Drawing Figures

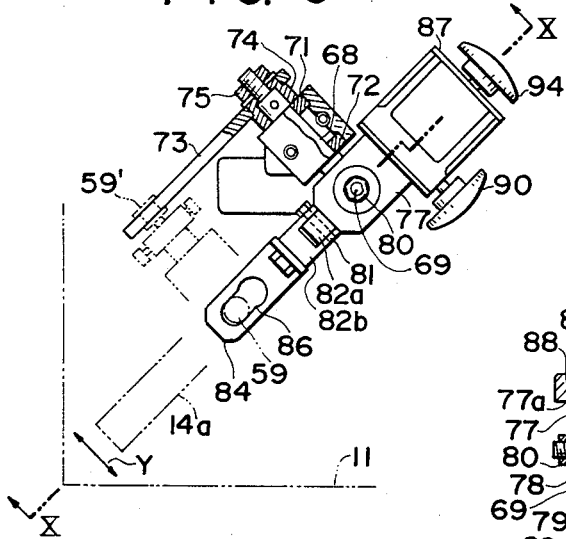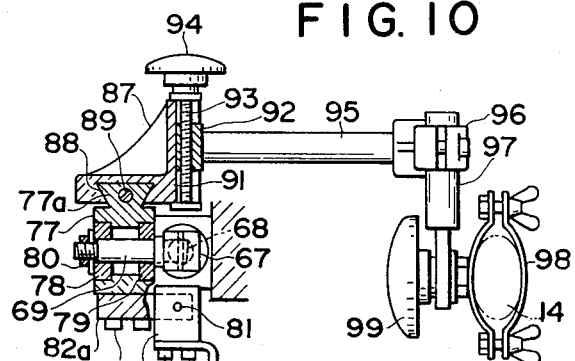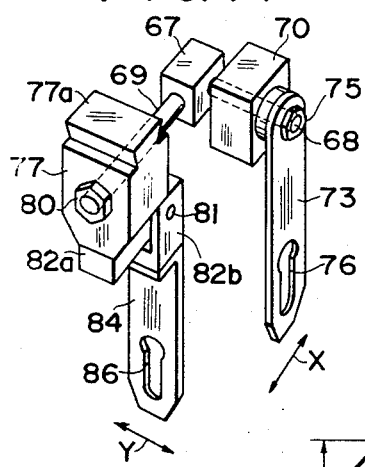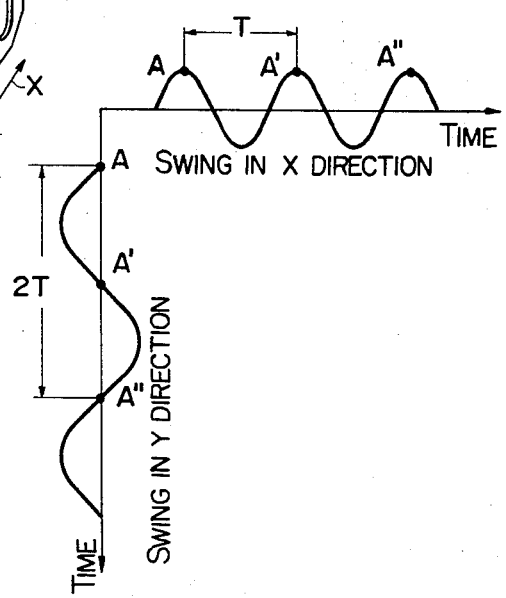

AUTOMATIC WELDING METHOD AND APPARATUS

BACKGROUND OF THE INVENTION

1. Field of the Invention

This inventiOn relates to a method and apparatus of automatic welding which is expected to find wide application in the welding operation on ships and bridges and other welded structures and by which a welding operation at any position is possible.

2. Description of the Prior Art

Generally, automatic welding is performed by moving along a weld line a self-driven carriage with a welding torch. In the prior art methods, the carriage is run along a guide rail in parallel with a weld line or with the work itself as a guide depending on the shape of the joint and welding position involved. The conventional methods, however, involve complicated guide rails and require special constructions of the carriage in the welding operations on a vertical, slanted or curved surface. Such restrictions make impossible automatic welding on certain joints. In addition, the use of a guide rail requires much time for positioning of the work and setting up of the carriage, adversely affecting the operating efficiency.

SUMMARY OF THE INVENTION

Accordingly, it is an object of this invention to provide an automatic welding method and apparatus which can be applied to a wide variety of joints and permits welding operations at any position.

Another object of the invention is to provide an automatic welding method and apparatus in which the welding torch can be guided accurately along the weld line by means of a simple device.

Still another object of the invention is to provide a small and light-weight self-driven carriage for all-position welding.

A further object of the invention is to provide a small and light-weight self-driven carriage provided with a weaving device which is driven by the same power source as the wheels of the carriage.

Another object of the invention is to provide a small and light-weight self-driven carriage provided with a weaving device which helps deepens the penetration of the weld zone.

Other objects and features of the invention will be apparent from the following description of embodiments with reference to the accompanying drawings.

BRIEF DESCRIPTION OF THE DRAWINGS

FIG. 9 is a diagram showing a side view of a welding torch support and a weaving device.

FIG. 10 is a diagram showing a sectional view taken along the line X — X in FIG. 9.

FIG. 11 is a perspective view showing the main components of the weaving device.

FIG. 12 is a diagram for explaining the operation of the weaving device.

FIG. 13 is diagrams showing the loci of the motion of the torch head.

DESCRIPTION OF THE PREFERRED EMBODIMENTS

Prior to the explanation of the method of welding according to the invention, the apparatus used therefor will be described.

The welding apparatus according to the invention comprises a self-driven carriage with a welding torch mounted on it, a device for feeding a welding wire to the torch, a power supply, and a control section for controlling the start and stop of the carriage movement, wire feed and arc, among which the present invention is aimed at the self-driven carriage.

Figure 1:
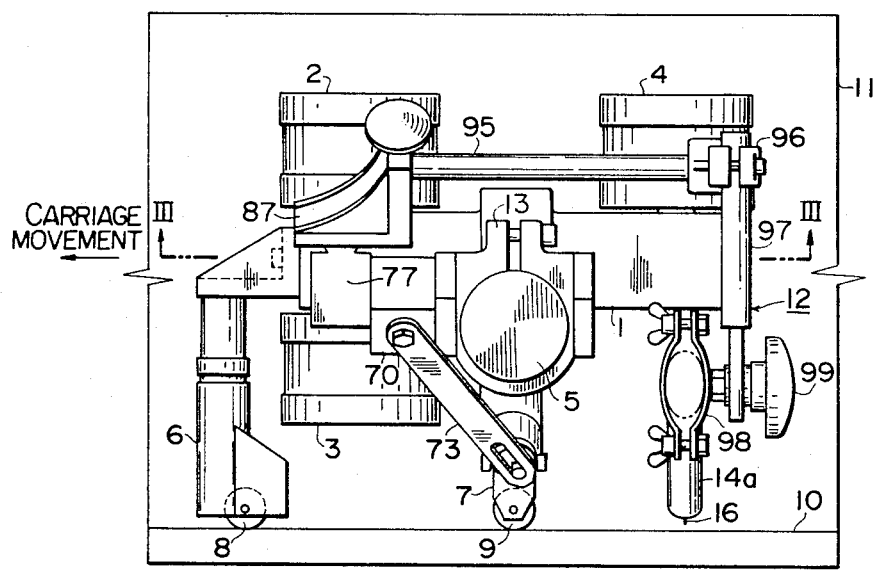
FIG. 1 is a diagram showing a plan of the self-driven welding carriage embodying the invention.
Figure 2:
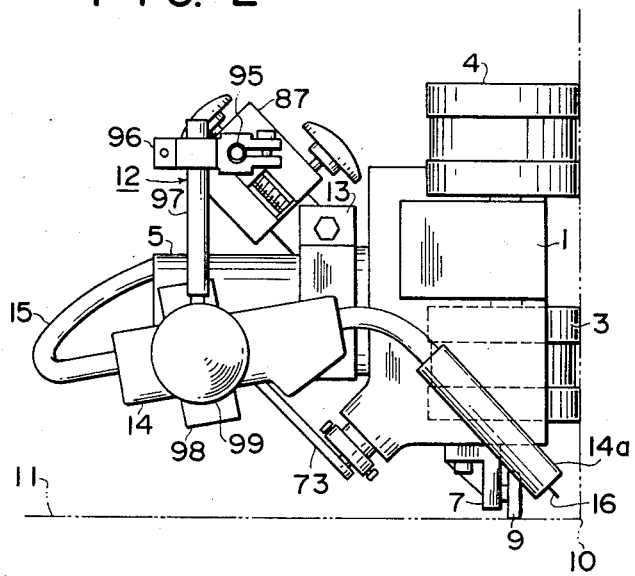
FIG. 2 shows a rear view thereof.

A self-driven carriage for fillet weld is shown in FIGS. 1 and 2. This self-driven carriage is provided with three driving wheels 2, 3 and 4, one on one side at the rear of the body 1 and the other two on both sides on the front thereof. At the center on the top of the body 1 is mounted a driving motor 5 for driving the driving wheels. Each of the driving wheels incorporates a strong magnet whereby the carriage is attached to and maintained in contact with the travelling path as it moves along it.

On the front and side of the center of the body 1 are replaceably bolted or otherwise fastened arms 6 and 7 extending from the body in the direction opposite from the rear driving wheel 4. At the end of each arm is a guide wheel 8 or 9 respectively with an axis at right angles to the travelling path of the carriage. These guide wheels guide the carriage along a guide perpendicular to the travelling path.

In the case of fillet welding, it is possible to use one side of the base metal 11 as the travelling path of the carriage and the opposite side thereof as the guide.

The torch support and weaving device generally shown by the reference numeral 12 are fixed on the base ring 13 provided on the body 1 in such a manner as to surround the motor 5. This torch support sets the torch head 14a at an appropriate position with respect to the weld zone 10 in the plane containing the axis of the rear driving wheel 4. During the welding operation, the welding wire 16 is fed to the welding torch 14 from a wire feeding means at a distant position through a flexible tube 15, while at the same time supplying shield gas through the same tube from the torch head 14a to the weld zone 10.

The component elements of the welding apparatus according to the invention will be now explained in detail.

Figure 3:
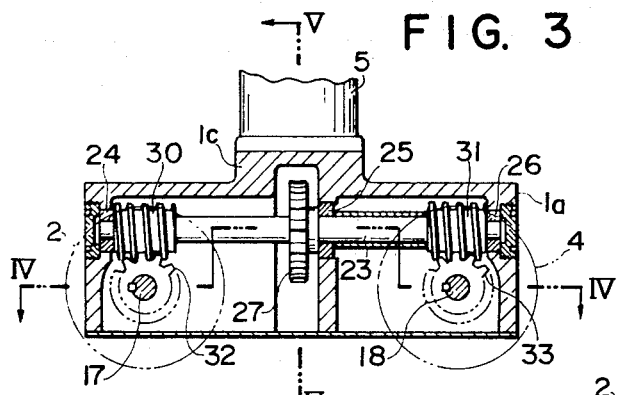
FIG. 3 is a diagram showing a sectional view of the carriage proper taken along the line III — III in FIG. 1.
Figure 4:
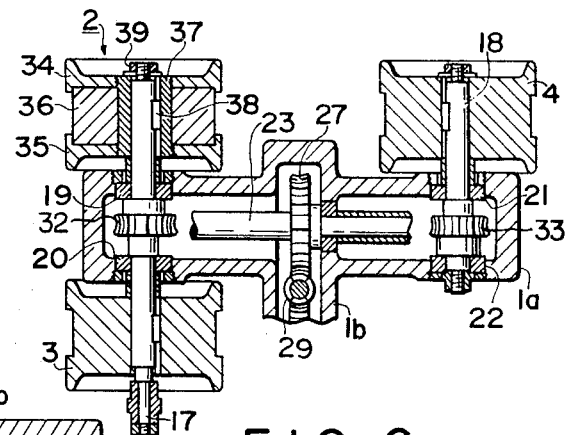
FIG. 4 is a diagram showing a sectional view taken along the line IV — IV in FIG. 3.

As shown in FIGS. 3 and 4, the body 1 comprises a section 1 extended in the longitudinal direction for containing the carriage driving section and a section 2 for containing the weaving device driving means, the motor mount 10 having its center disposed on the section 1b extended sideway of the body.

On the body section 1a are supported, by the agency of the bearings 19 to 22, the front and back axles 17 and 18 which carry the driving wheels 2, 3 and 4. Also, across the axles 17 and 18 is a main shaft 23 which is supported through the bearings 24 to 26. The worm gear 27 at the center of the main shaft 23 engages with the worm 29 on the motor output shaft 28, while the worms 30 and 31 mounted on the axles 17 and 18 mesh with the worm gears 32 and 33 respectively, so that the rotation of the motor output shaft which is further reduced is transmitted to the front and back axles 17 and 18. Each of the driving wheels 2, 3 and 4 comprises, as shown in the upper left of FIG. 4, a pair of disc-shaped rims 34 and 35, an annular permanent magnet 36 interposed between the rims 34 and 35 and a boss 37 of nonmagnetic material such as brass which is connected by the rims and screws. The driving wheels 2, 3 and 4 are fixed on the axles 17 and 18 by means of the key 38 and the nut 39 screwed in the axle ends. The magnet 36 is so magnetized as to have its magnetic poles on its surfaces in contact with the rims 34 and 35, and therefore its magnetic force allows the driving wheels to be attracted to the travelling path in contact with the rims 34 and 35 as they roll along it. The magnetic attraction is strong enough to support the weight of the whole carriage.

Figure 5:
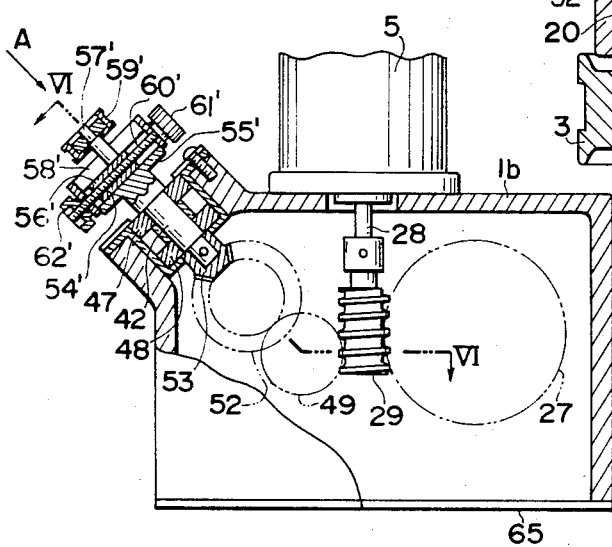
FIG. 5 is a diagram showing a sectional view taken along line V — V of FIG. 3.
Figure 6:
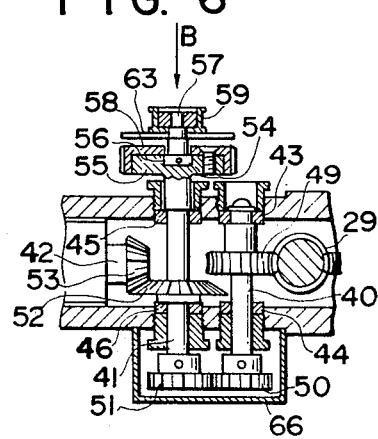
FIG. 6 is a diagram showing a sectional view taken along the line VI — VI in FIG. 5.

The transversely extended body section 1b, as shown in FIGS. 5 and 6, supports, through the bearings 43 to 48, the shafts 40 and 41 and the shaft 42 with one end projected obliquely upward through a corner of the body. The worm gear 49 on the shaft 40 engages with the worm 29 on the motor output shaft, while the spur gear 50 on one end of the shaft 40 engages with the spur gear 51 on one end of the shaft 41. Further, the bevel gear 52 on the shaft 41 meshes with the bevel gear 53 on the shaft 42, whereby the rotation of the motor output shaft 28 is reduced appropriately for transmisSion to the shafts 41 and 42. The gear ratio between the bevel gears 52 and 53 are so set as to make the revolutions of the shafts 41 and 42 in the ratio of 1 to 2.

Figure 7:
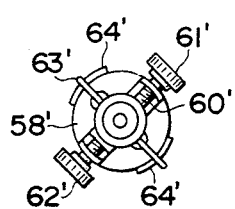
FIGS. 7 and 8 are views taken in the directions of arrows A and B respectively in FIGS. 5 and 6.
Figure 8:
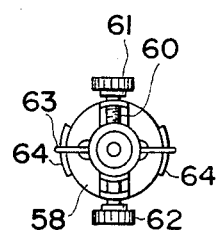

That end of the shaft 41 which is projected from the side wall of the body and which is opposite from the bevel gear 51 is provided with a disc 55 carrying the guide groove 54 in the radial direction. The slide piece 56 fitted in the guide groove 54 carries a pin 57. A roller 59 is mounted on the end 57 of the pin 57 which is projected through the groove of the cover 58 fixed on the disc 55. The screw shaft 60 inside the guide groove 54 is screwed in the guide piece 55. Knobs 61 and 62 are fixed on both ends of the screw shaft 60 which is projected through the side wall of the cover 58. By turning the knobs 61 and 62, the slide piece 55 moves along the guide groove 54, thereby enabling the adjustment of any deflection of pin 56 with respect to the shaft 41. Such deflection is indicated by the indicator 63 mounted on the pin 56 and by the scale 64 on the cover 57. A similar device is provided also on the end of the shaft 42 projected from a corner of the body, the numerals 54' to 64' in FIGS. 5 and 7 denoting corresponding parts to those as shown by the numerals 54 to 64 in FIGS. 6 and 8. The symbol W' shows the deflection of the pin 56' from the shaft 42. The under side of the body 1 is closed with a dust-proof cover 65, and the bevel gears 50 and 51 are also covered with another dust-proof protective means 66.

The torch support and the weaving device will be now explained with reference to FIGS. 9 to 11.

The weaving device has a pair of fulcrum shafts 68 and 69 which are coupled with each other at right angles by means of the joint 67. The first fulcrum shaft 68 is supported on the fixing member 70 through the bearings 71 and 72, and a swinging lever 73 is fixed on one end thereof with the washer 74 and the nut 75. In the slit 76 formed in the swinging lever 73 is movably fitted the roller 59' in the longitudinal direction of the slit as shown in FIG. 5.

On the other hand, the block 77 is rotatably mounted on the second fulcrum shaft 69 through the bearings 78 and 79 and prevented by the nut 80 from slipping out. A plurality of hinge plates are connected by the pin 81, and one of them marked with the numeral 82a is fastened to the block 77 with the blot 83, and the other hinge plate 82b is fixed on the swinging lever 84 by means of the bolt 85. The roller shown in FIG. 6 which meshes with the slit 86 in the swinging lever 84 is movable in the longitudinal direction.

The first fulcrum shaft 68 is positioned in the plane perpendicular to the direction in which the carriage moves. With the rotation of the shaft 42 shown in FIG. 5, the first swinging lever 73 swings in the direction shown by arrow X in a plane along the direction of carriage movement, with the shaft 68 as a supporting point, with the amplitude equivalent to 2W' and at the frequency of T.

Also, the second fulcrum shaft 69 is contained in the plane along the direction of carriage movement. The second swinging lever 84 on the block 77, with the rotation of the shaft 41 shown in FIG. 6, swings with the shaft 69 as a supporting point in the direction of arrow Y with the amplitude of 2W and at the frequency of 2T in the plane at right angles to the direction of carriage movement. As a consequence, a combined swing of the first and second levers 73 and 84 in the directions of arrows X and Y is applied to the block 77 with the two supporting points in the shafts 68 and 69.

The fixing member 70 is fixed on the base ring 13 shown in FIG. 1 at such a position that the motions in the directions X, Y and Z are applied to the block 77. The hinge consisting of the pin 81 and plates 82a and 82b is such that the block 77 swings in the direction of X with the shaft as a supporting point while maintaining the swinging lever 84 in mesh with the roller 59.

The trapezoidal section 77a projected from the block 77 is fitted in the trapezoidal groove 88 provided on the under side of the torch position adjusting head 87. A knob 90 is fixed on the end of the screw shaft 89 which is planted in the trapezoidal section 77a and which is projected from the adjusting head 77. Rotating the knob 90 causes the adjusting head 77 to move in the direction at right angles to the face of the paper of FIG. 10. A slide piece 92 is fitted in the trapezoidal groove 91 formed on the side of the adjusting head 87, and the knob 94 is fixed on that end of the screw shaft 93 planted in the slide piece 92 which is projected from the adjusting head 77. By rotating the knob 94, the slide piece 92 moves in the vertical direction as seen in FIG. 10. One end of the pipe arm 95 is fixed on the slide piece 92, while another pipe arm 97 is fixed, at right angles to the pipe arm 95, on the pipe arm 95 through the joint 96. The torch 14 is held by the clamp 98 at the end of the pipe arm 97 and fixed in a desired direction by means of the knob 99. In the torch support constructed as described above, the torch is capable of being adjusted at any position in the transverse direction by means of the knob 90 while the knob 94 permits the vertical adjustment of the torch position.

Figure 14A:
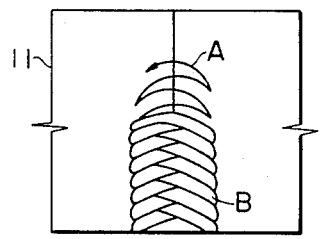
FIGS. 14a to 14c are diagrams for explaining the weaving operation in fillet welding.
Figure 14B:
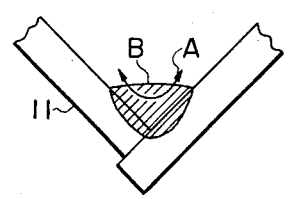
Figure 14C:
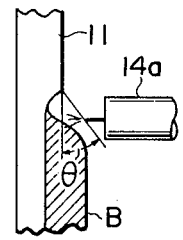

Assuming now that, as shown in FIG. 9, the torch end 14a is positioned in the plane containing the fulcrum shaft 69, the above mentioned motion of the weaving device causes the torch end 14a to be subjected to the swings in the directions of arrows X and Y with the fulcrum shafts 68 and 69 as supporting points respectively at the same time. Referring to FIG. 12, the curve along the abscissa shows the relationship between the amplitude and time of the swinging force applied to the torch end in the direction of X, while the one along the ordinate indicates the relation between the amplitude and time of the swinging force applied to the torch end in the direction of Y. As is apparent from the drawing, the frequencies of the swings in the directions of X and Y are in such a relation that the locus of the motion of the torch end varies as shown in FIGS. 13a to 13e depending on the phase relation between the swings in the directions of X and Y. For example, if the phases of the swings in the directions of X and Y are set in such a manner as to agree with each other at the points A, A' and A'' in FIG. 12. The locus of the motion of the torch end takes the shape of a mountain as shown in FIG. 13a, of which the application to fillet weld is shown in FIG. 14. In this figure, the symbol A shows the locus drawn by the torch end as the carriage advances, and the symbol B a welding bead formed by the welding operation along the locus. The torch end 14a is inserted deep into the fillet of the base metal obliquely at the angle of $\theta$ with respect to the welding line, while drawing a mountain-shaped locus. This results in the penetration which is deeper than that in the weaving across the welding line in a single direction. Also, the arc length varies less, improving the arc stability.

The weaving motion in the directions of both X and Y as employed in the above embodiment is applicable, not only to fillet welding, but to butt welding. Other loci of motion as shown in FIGS. 13b to 13e may be effectively used depending on the shape of the joint. In the case where the shape of the joint or the welding position eliminates the need for weaving motion in the direction of X, the swing of lever 73 may be stopped, limiting the weaving motion to the one in the direction of Y.

The fact that the carriage driving wheels and the weaving devices for the weaving motion in the directions of both X and Y derive their power from a single motor not only eliminates the need for an independent driving source but permits the apparatus to be constructed in small size and light in weight.

Explanation will be made now of the methods of welding various joints by the use of the above-described apparatus.

Figure 15:
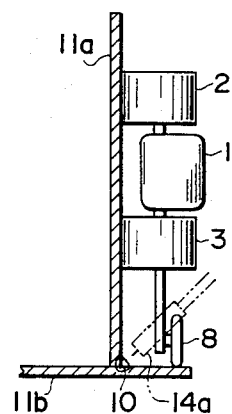
FIG. 15 is a diagram showing a front view showing roughly the manner in which fillet welding is performed according to the invention.
Figure 16:
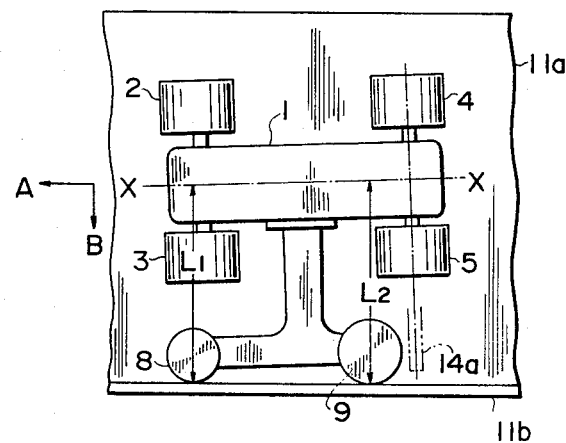
FIGS. 16 and 17 show a side view and a plan thereof respectively.
Figure 17:
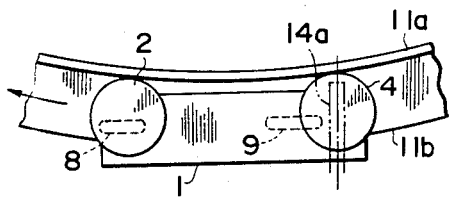

FIGS. 15 to 17 show an example of the manner in which a fillet welding is conducted between a cross plate and a longitudinal plate one of which has a small width, as in the case of welding a bottom plate on a girder, beam or cylinder. In such a case, the magnetic driving wheels 2 to 5 of the carriage are attracted to the longitudinal plate or the work 11a, while the guide wheels 8 and 9 are brought into contact with the horizontal surface of the cross plate 11b which acts as a guide. The front and back guide wheels 8 and 9 are differentiated in diameter or brought out of alignment, so that the distances $L_1$ and $L_2$ from the points at which the guide wheels 8 and 9 respectively contact the guide surface, to the center line of the carriage X—X, have the relation, $L_1 < L_2$.

Under these conditions, rotating the driving wheels 2 to 5 causes the carriage to tend to move obliquely with respect to the guide surface, the carriage driving force being divided into two components, one in the direction of A in parallel with the guide surface and the other in the direction of B perpendicular thereto. The component of the force in the direction of B presses the guide wheels 8 and 9 against the guide surface, while the carriage moves in the direction of A in parallel with the guide surface, thus performing an automatic welding operation by the torch 14 which is directed toward the weld zone 10.

The carriage path may be either flat or curved, and if the torch is set in the plane containing the axis of the rear driving wheels 4 and 5, the distance between the torch head and the weld zone is maintained constant even in the case of welding of a curved portion, making it possible to obtain uniform results.

The above-described embodiment refers to the case in which four driving wheels are provided on the front and back of the body. But as shown in FIGS. 1 to 4, one of the rear driving wheels may be removed and replaced with a welding torch. By so doing, the space needed for carriage path can be lessened thereby widening the applications of the invention.

Figure 18:
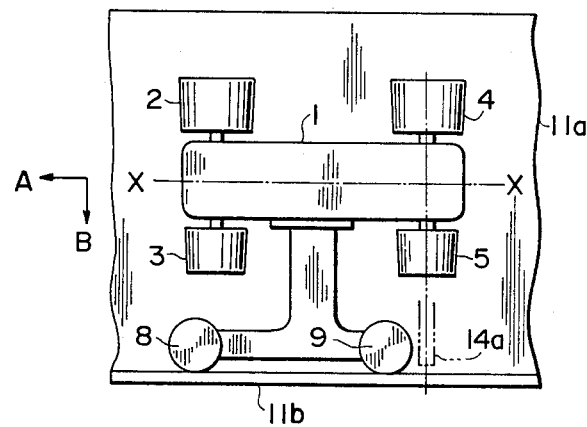
FIG. 18 is a diagram showing a side view of an embodiment which is partly modified from the embodiment of FIG. 16.

As another means for obtaining the component of force to press the guide wheels against the guide surface, the driving wheels 2 to 5 may be tapered as shown in FIG. 18 to differentiate the peripheral speeds of the driving wheels on both sides.

Explanation will be made now of an application of the invention to butt welding.

Figure 19:
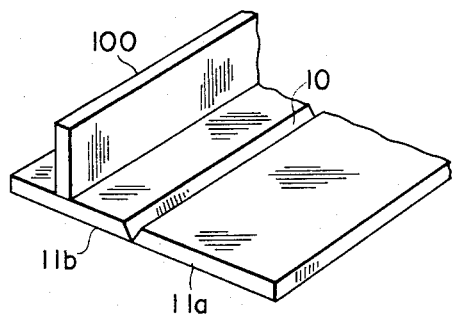
FIG. 19 is a perspective view showing the manner in which a guide plate is mounted for butt welding.
Figure 20:
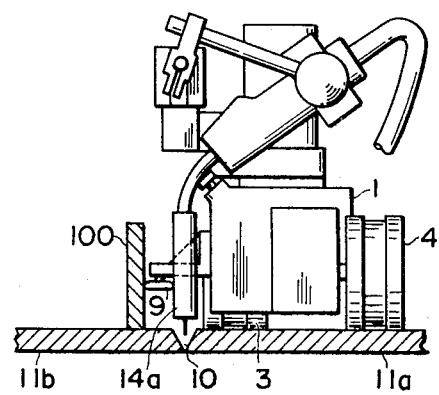
FIG. 20 is a diagram of a rear view illustrating the manner in which the flat butt welding is performed according to the invention.

Referring to FIG. 19, in the case of butt welding, a separate guide plate 100 is provisionally attached to the work 11b at one side of the weld zone in parallel therewith. An application of the invention to flat butt welding is illustrated in FIG. 20, in which the magnetic driving wheels 2 to 4 of the carriage are attracted to the work 11a, while the guide wheels 8 and 9 are maintained in contact with one side of the guide plate 100 at right angles to the carriage path provisionally attached to the work 11b in the same plane as the work 11a. As in the case of the application of FIG. 16, the carriage is moved while the guide wheels are pressed against the guide surface by a component of the force, and the torch 14 is moved along the weld zone 10.

Figure 21:
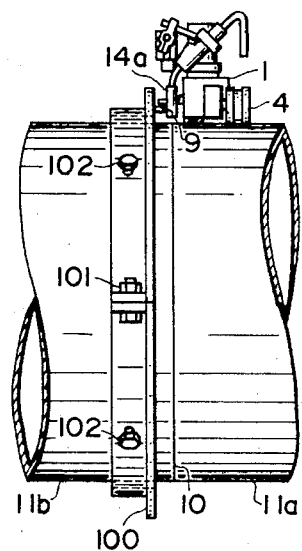
FIG. 21 is a rear view showing the manner in which circumferential butt welding is performed according to the invention.
Figure 22:
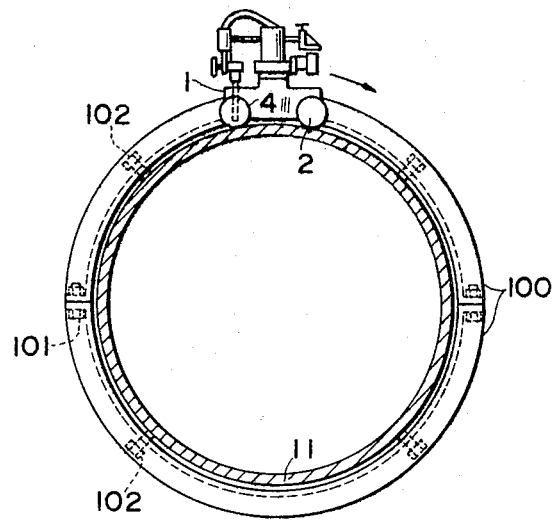
FIG. 22 is a side view thereof.

FIGS. 21 and 22 show an application of the invention to the butt welding of pipes with a large diameter. An annular guide plate 100 consists of two separate portions so that it fits around the outside periphery of the pipes. This guide plate 100 is fastened on the periphery of the work 11 by means of bolt and nut 101, and the guide surface of the guide plate 100 integrated with the work 11 is fixed in parallel with the weld zone with a plurality of dump bolts 102. The magnetic driving wheels 2 to 4 of the carriage are attracted to the peripheral portions of the work, while at the same time the guide wheels 8 and 9 are brought into contact with one side of the guide plate 100 at right angles to the carriage path. Thus, the carriage is moved in the same way as the case of FIG. 20 to perform a peripheral welding.

The peripheral welding of a large-diameter pipe has so far been conducted by means of a special automatic peripheral welding machine comprising a guide ring with teeth formed on its periphery and a self-driven carriage driven by a gear supported by the guide ring and which engages with the guide ring. The employment of the self-driven carriage according to the present invention simplifies the butt welding of various sizes of large-diameter pipes by utilizing a simple guide plate described above.

Figure 23:
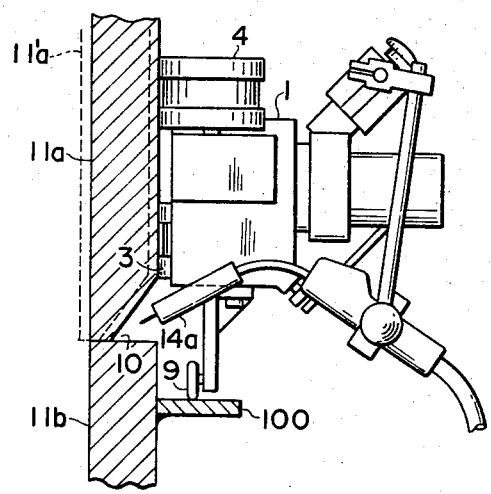
FIG. 23 is a rear view showing the manner in which horizontal butt welding is performed according to the invention.

The application of the invention to horizontal butt welding is shown in FIG. 23. In horizontal butt welding between the upper plate 11a with a bevelling and the lower plate 11b without any bevelling, the guide plate 100 is provisionally attached to the side of the lower plate 11b in parallel with the weld zone 10. The guide wheels 8 and 9 are brought into contact with the upper side of the guide plate, and the magnetic driving wheels 2 to 4 are attracted to the side of the upper plate 11a. The torch 14a is directed toward the weld zone 10. Under this condition, the carriage travels as the guide wheels 8 and 9 are maintained pressed against the guide plate 100 as in the preceding embodiment.

In the conventional methods of horizontal butt welding, a self-driven carriage is moved along a guide rail. It is, however, difficult to set the guide rail exactly in parallel with the welding line. Also, if a thick upper plate is involved, it is liable to slip out of alignment, as shown by the dotted line 11a' in FIG. 23, at the joint, and the torch is incapable of following the deviation. By contrast, according to the invention, the guide plate can be positioned with a higher accuracy, and also the attraction of the driving wheels to the upper plate 11a permits the torch to move on following the upper plate 11a even if the upper plate 11a deviates from position, thus making possible uniform welding results.

Figure 24A:
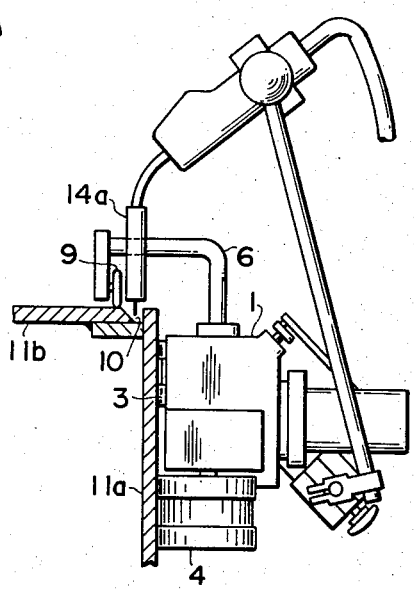
FIGS. 24a to 24d are diagrams of rear views showing the manner in which corner welding is performed according to the invention.
Figure 24B:
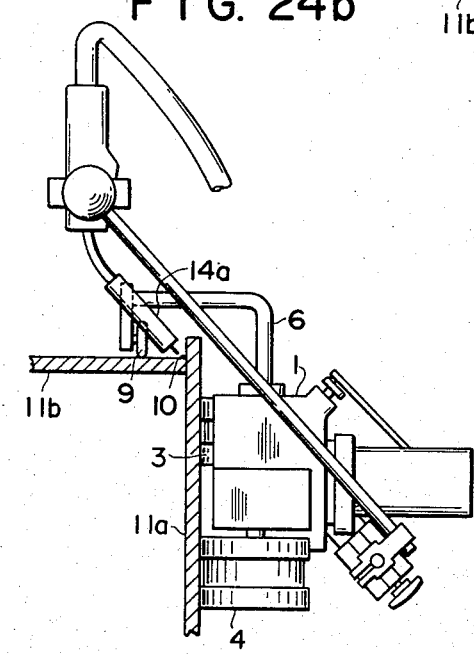
Figure 24C:
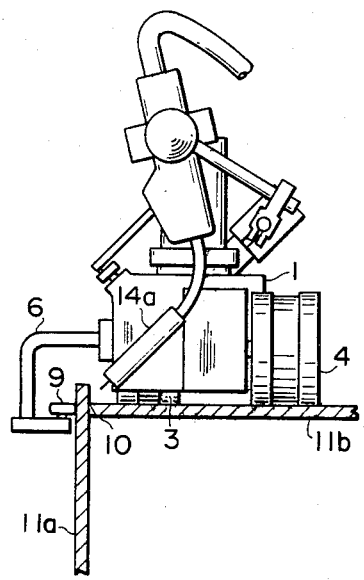
Figure 24D:
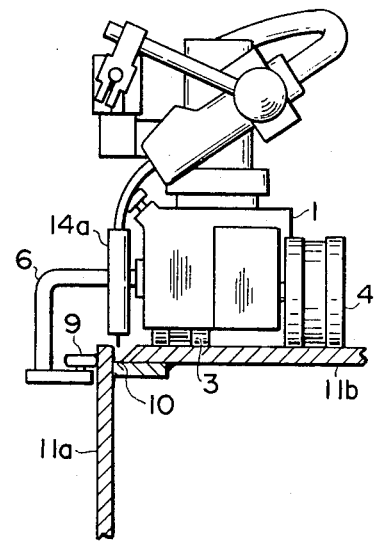

An application of the invention to the corner butt welding of the longitudinal and cross plates 11a and 11b is illustrated in FIGS. 24a and 24d, while FIGS. 24b and 24c show a case in which the longitudinal and cross plates 11a and 11b are joined by the corner fillet welding, both of which are characterized by the work which is too small in width on one side of the weld zone to be used as a guide surface.

Figure 25:
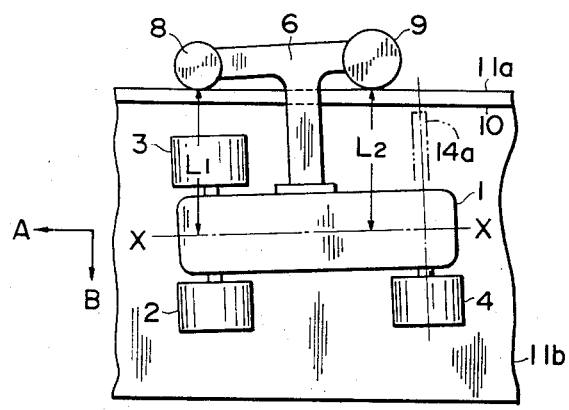
FIG. 25 is a plan showing a rough illustration thereof.
Figure 26:
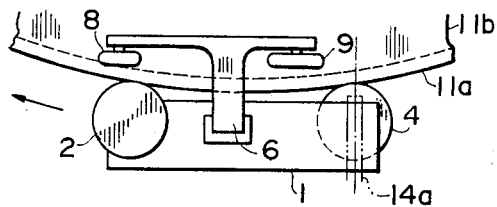
FIG. 26 is a side view thereof.

In such a case, as shown in FIGS. 25 and 26, the magnetic driving wheels 2 to 4 are attracted to one of the work plates, while the front and back guide wheels 8 and 9 with their axes at right angles to the carriage path and mounted at the end of the support arm 6 extended toward the other plate, say, plate 11a are maintained in contact with the plate 11a. If the distances $L_1$ and $L_2$ from the points at which the guide wheels 8 and 9 respectively contact the guide surface, to the axis X—X of the carriage, are so set as to maintain the relation $L_1 > L_2$, two components of force are applied to the carriage in the direction of A in parallel with the weld zone and in the direction of B away from the weld zone 10 respectively with the rotation of the driving wheels, with the result that the guide wheels 8 and 9 are pressed against the guide surface as the carriage travels.

As in the embodiment of FIG. 17, the automatic welding of the curved portion can be successfully performed by attracting the magnetic driving wheels to the curved surface of the work.

As can be seen from the above description, the self-driven carriage according to the present invention can be applied to a wide variety of joints simply by replacing the guide wheels. In addition, the carriage is firmly adhered to the travelling path by means of the magnetic driving wheels as it travels along the welding line, making possible fully automatic welding operations in any position at a great saving of labor.

We claim:

1. A self-driven welding carriage comprising a body, a plurality of magnetic driving wheels disposed at the front and rear of the body which roll along a carriage path while being adhered thereto, a driving means contained within said body for rotating said driving wheels, a pair of front and rear guide wheels each supported by an arm projected from one side of said body, said guide wheels each having an axis at right angles to the axes of the driving wheels and arranged for contacting a guide surface, a welding torch support mounted on said body, and a means for generating a component of force for pressing said guide wheels against the guide surface in contact therewith upon the rotation of said driving wheels.

2. A self-driven welding carriage according to claim 1, in which said driving wheels are disposed on both sides of the front of the body and on one side of the rear thereof, and said welding torch is supported by said torch support in such a manner that the head of the welding torch is positioned almost in a plane at right angles to the carriage path and containing the axis of the rear driving wheel, said head of the torch being positioned on the side of the body opposite from said rear driving wheel.

3. A self-driven welding carriage according to claim 1, in which said torch support is coupled with a swing lever which swings in the plane at right angles to the carriage path, said swing lever engages with an eccentric pin mounted on one end of a rotary shaft projected from the body, and said rotary shaft is coupled with a rotary shaft of said driving means through a gear.

4. A self-driven welding carriage according to claim 1, in which said guide wheels and said supporting arm are replaceably mounted on the body, and said welding torch support is so constructed that the position and direction of the head of said welding torch are variable within the plane containing one of the axes of said driving wheels and perpendicular to the carriage path.

5. A self-driven welding carriage according to claim 7, comprising a weaving means interposed between said welding torch support and said body for applying to the torch the motion which is a combination of a swing in a plane in parallel with a driving direction of the carriage and a swing in a plane at right angles to said driving direction; said weaving means including first and second rotary shafts at right angles to each other, first and second eccentric pins projected from the ends of said first and second rotary shafts respectively, a first swing lever in mesh with said first eccentric pin for swinging in a plane in parallel with said driving direction, a second swing lever in mesh with said second eccentric pin for swinging in a plane at right angles to the carriage path, a first swing axle supporting said first swing lever and rotating integrally with said first swing lever, a second swing axle coupled at right angles to said first swing axle, a fixing member for supporting said first swing axle, a block rotatably supported on said second swing axle, a hinge means for movably coupling said second swing lever to said block at right angles to the direction of the swing of said second swing lever, a means for fixing a welding torch support on said block, a means for transmitting power to said first and second rotary shafts from a common power source in such a manner that said first and second swing levers swing at the frequencies in the ratio of 1 to 2.

6. A self-driven welding carriage according to claim 5, in which said driving means for rotating said driving wheels is used at the same time as the power source for said weaving means.

7. A method of automatic welding by the use of a self-driven carriage having a plurality of magnetic driving wheels arranged on the front and back of the carriage body, a driving means for rotating the driving wheels, and a pair of front and rear guide wheels each supported on an arm projected from one side of the body, the guide wheels each having an axis perpendicular to the axis of the driving wheels, comprising the steps of adhering the driving wheels to the surface of a base metal on one side of a weld zone, moving the carriage on the surface of the base metal, contacting the guide wheels with a guide surface positioned at right angles to the carriage path of travel, mounting a welding torch on the carriage in such a manner that its head is positioned approximately in a plane containing one of the axes of the driving wheels and at right angles to the carriage path, providing a driving force for causing movement of the carriage and having a first force component in a direction parallel with the guide surface and a second force component perpendicular to the guide surface for pressing the guide wheels against the guide surface, and guiding the torch along the weld zone.

8. A method of automatic welding according to claim 7, comprising the steps of utilizing the surface of the base metal on the other side of the weld zone as a guide surface, bringing the pair of guide wheels into contact with said guide surface, and conducting fillet welding.

9. A method of automatic welding according to claim 7, comprising the steps of mounting the guide member as a guide surface on the base metal, and maintaining the pair of guide wheels in contact with one side of the guide member.

10. A method of automatic welding according to claim 9, in which the base metal consists of a cylinder and the guide member consists of a ring surrounding the base metal cylinder, and comprising the steps of pressing the guide member against the surface of the base metal by means of a plurality of fastening bolts on the periphery thereof, and conducting peripheral welding.

11. In a method of welding automatically, along an almost horizontal welding line formed by an upper base metal with a beveling to a lower base metal without any beveling, the improvement comprising the steps of employing a self-driven carriage having a plurality of magnetic driving wheels disposed on the front and back of the carriage body, a driving means for rotating the driving wheels, and a pair of front and rear guide wheels each supported on an arm projected from one side of the body and having an axis perpendicular to the driving wheels, adhering the driving wheels to the surface of said upper base metal which serves as a carriage path, maintaining the pair of guide wheels in contact with one side of a guide member fixed on the lower base metal in parallel with the weld zone line, mounting a welding torch on said carriage and directing the torch toward the weld zone in such a manner that the head of the torch is positioned almost in the plane extending at right angles to the carriage path and containing one of the axes of the driving wheels, providing a driving force for causing travel of the carriage and having one force component in a direction parallel with the guide surface and another force component in the direction perpendicular to the guide surface for pressing the guide wheels against the guide surface, and guiding the torch along the weld zone.

12. In a method of welding automatically a corner of work, the improvement comprising the steps of employing a self-driven carriage having a plurality of magnetic driving wheels disposed on the front and back of the carriage body, a driving means for rotating the driving wheels, an arm projected from the body and extending from one side of the corner of the work to the other side thereof over the corner thereof, and a pair of front and rear guide wheels mounted at the end of the arm and having axes at right angles to the axes of the driving wheels, adhering the driving wheels to one side of the corner of the work, the one side acting as a carriage path, maintaining the guide wheels in contact with the other side of the work beyond the corner thereof, the other side serving as a guide surface for the movement of the carriage, mounting a welding torch on said carriage and directing the torch toward a weld zone at the corner of the work in such a manner that the head of the torch is positioned almost in the plane at right angles to the carriage path, the plane containing one of the axes of said driving wheels, and providing a driving force for causing travel of the carriage and having one force component in a direction parallel with the guide surface and another force component in a direction perpendicular to the guide surface for pressing the guide wheels against the guide surface, and guiding the torch along the weld zone.

13. A self-driven welding carriage according to claim 1, wherein the guide surface is perpendicular to the surface over which said driving wheels travel and said means for generating a component of force includes mounting said front and rear guide wheels to provide distances $L_1$ and $L_2$ from the point of contact between the respective front and rear guide wheels and the guide surface to the center line of the carriage body such that $L_1 > L_2$.

* * * * *